United States Patent
Watanabe et al.

(10) Patent No.: US 8,391,344 B2
(45) Date of Patent: Mar. 5, 2013

(54) TRANSCEIVING DEVICE OF PULSE SIGNAL

(75) Inventors: Kenichi Watanabe, Nishinomiya (JP);
Yasunobu Asada, Nishinomiya (JP);
Shinji Ogawa, Nishinomiya (JP)

(73) Assignee: Furuno Electric Company, Ltd.,
Nishinomiya-Shi (JP)

( * ) Notice: Subject to any disclaimer, the term of this patent is extended or adjusted under 35 U.S.C. 154(b) by 311 days.

(21) Appl. No.: 12/473,971

(22) Filed: May 28, 2009

(65) Prior Publication Data

US 2009/0296789 A1    Dec. 3, 2009

(30) Foreign Application Priority Data

May 29, 2008    (JP) ................................ 2008-140335

(51) Int. Cl.
*H04B 1/38* (2006.01)

(52) U.S. Cl. ........................................ 375/219

(58) Field of Classification Search ................ None
See application file for complete search history.

(56) References Cited

U.S. PATENT DOCUMENTS

| 3,460,141 A | 8/1969 | Bouman |
| 4,666,295 A * | 5/1987 | Duvall et al. ................ 356/5.09 |
| 5,546,383 A * | 8/1996 | Cooley et al. ................ 370/330 |

FOREIGN PATENT DOCUMENTS

| JP | 2005-085167 A | 3/2005 |
| JP | 2005-249398 A | 9/2005 |

OTHER PUBLICATIONS

J. R. Klauder et al., The Theory and dising of Chirp Radars, Jul. 1960, The Bell System Technical Journal.*
Lay R. Varshney et al., Sidelobe Reduction for Matched Filter Processing, 2003, IEEE.*
Klauder et al., The Theory and Design of Chirp Radars, Jul. 1960, The Bell System Technical Journal.*
Varshney et al. sidelobe Reduction for Matchedfilter Range Processing, 2003, IEEE Radar Conference.*

\* cited by examiner

*Primary Examiner* — David C. Payne
*Assistant Examiner* — Wednel Cadeau
(74) *Attorney, Agent, or Firm* — Birch, Stewart, Kolasch & Birch, LLP

(57) ABSTRACT

A transceiving device includes a transmission signal generating module for generating a transmission signal that is frequency-modulated by a predetermined frequency sweep width, a transceiver module for transmitting a pulse signal having substantially the same waveform as a waveform of the transmission signal and receiving an echo signal corresponding to the transmission signal from a detection range, and a pulse-compression filter for pulse-compressing the echo signal received by the transceiver module. The pulse-compression filter has an input/output characteristic. The characteristic has, when the pulse-compression filter is inputted with an input signal having substantially the same waveform as the waveform of the transmission signal, a window function shape such that a phase spectrum of an output signal corresponding to the input signal is linear and an amplitude spectrum of the output signal does not have a frequency component other than a frequency band with which a frequency sweep is carried out.

8 Claims, 3 Drawing Sheets

TRANSCEIVING DEVICE OF PULSE SIGNAL

CROSS-REFERENCE TO RELATED APPLICATION(S)

This application claims priority under 35 U.S.C. §119 to Japanese Patent Application No. 2008-140335, which was filed on May 29, 2008, the entire disclosure of which is hereby incorporated by reference.

TECHNICAL FIELD

The present invention relates to a transceiving device that transmits a pulse signal, such as an ultrasonic wave or an electric wave, and performs a pulse-compression process on a received signal.

BACKGROUND

Fishfinders as one type of transceiving devices of pulse signals transmit a transmission pulse of ultrasonic wave underwater from a transducer, and receives with the transducer echo signals produced by the transmission pulse, which are reflected by a seabed or a shoal of fish. The fishfinder then processes the received signal, and displays an image of the seabed or shoal of fish on a display thereof.

With such fishfinders, improvement in detection distance is required to detect a shoal of fish at a deeper location. In order to improve the detection distance, generally, the transmission pulse is simply lengthened. However, if the transmission pulse is lengthened, the reflected echo from a target object will also become longer and axial resolving power will be reduced. Therefore, a method is adopted in which a transmission pulse is frequency-modulated, and the echo signal received with a matched filter, and a replica waveform of the transmission signal are correlation-processed to pulse-compress the received signal to improve the axial resolving power. An underwater detection device that performs such a pulse-compression process is disclosed in JP2005-249398(A).

In the fishfinder that performs the pulse-compression process, false images referred to as "range side lobes" occur at positions before and after an echo that shows a location of a target object. When the range side lobes occur, it is difficult to distinguish a detected target image from the others, and particularly, range side lobes caused by the seabed hide an image of a shoal of fish located at the seabed and, thus, may make the shoal of fish undetectable. In order to suppress the range side lobes, generally, a measure of multiplying the transmission signal by a window function, such as a Gaussian window, is performed.

When applying the window function (e.g., Gaussian window) to the transmission signal to perform the matched filtering process, expansion of a dynamic range of the window function is effective to reduce the range side lobes. However, in order to realize a target suppression level for the range side lobes of less than −64 dB, which is required for typical fishfinders, a measure is required to acquire a dynamic range of 40 dB or greater and control B pressure of a PDM transmitting amplifier, etc. Thus, hardware thereof will be complicated and the cost will be increased as well.

Further, the multiplication of the transmission signal by the window function having an acute shape, such as a Gaussian window, substantially shortens a pulse width. Therefore, detection performances, such as a signal-to-noise (S/N) ratio and a detection distance, may deteriorate comparing with a case using a transmission signal having a rectangular envelope.

SUMMARY

The present invention is made in view of the above-described conditions, and provides an improved transceiving device of a pulse signal as described below.

According to an aspect of the invention, a transceiving device of a pulse signal includes a transmission signal generating module for generating a transmission signal that is frequency-modulated by a predetermined frequency sweep width, a transceiver module for transmitting a pulse signal having substantially the same waveform as a waveform of the transmission signal and receiving an echo signal corresponding to the transmission signal from a detection range, and a pulse-compression filter for pulse-compressing the echo signal received by the transceiver module. The pulse-compression filter has an input/output characteristic. The characteristic has, when the pulse-compression filter is inputted with an input signal having substantially the same waveform as the waveform of the transmission signal, a window function shape such that a phase spectrum of an output signal corresponding to the input signal is linear and an amplitude spectrum of the output signal does not have a frequency component other than a frequency band with which a frequency sweep is carried out.

The window function shape may have a dynamic range which is determined based on a level of range side lobes and a width of a main lobe in a time range of the output signal.

The input signal may include distortion generated after the transmission signal generating module outputs the transmission signal and before the echo signal received by the transceiver module is inputted into the pulse-compression filter.

The transmission signal generating module may generate the transmission signal having an envelope of a shape in which sine-shaped edges are added to both ends of a rectangular window.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Figure 1:
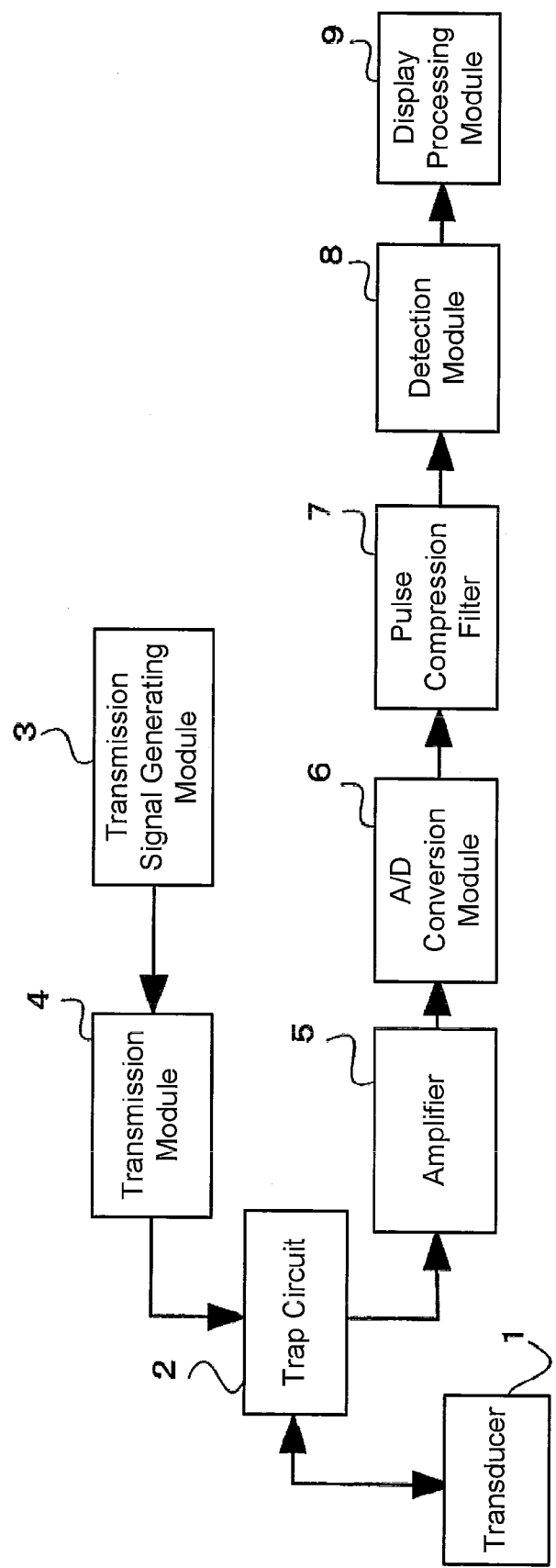
FIG. 1 is a block diagram showing a configuration of a fishfinder according to an embodiment of the present invention.

FIG. 1 is a block diagram showing a configuration of a fishfinder, as one type of transceiving devices of a pulse signal, according to the present invention. In FIG. 1, a transducer 1 typically provided to a ship's bottom is driven by an electric signal supplied from a transmission module 4 via a trap circuit 2 based on a frequency-modulated transmission signal generated by a transmission signal generating module 3 to transmit underwater an ultrasonic pulse signal having substantially the same waveform as that of the transmission signal. The transducer 1 receives a returned signal that is an echo reflected by an underwater target object, and then outputs the received signal to an amplifier 5 via the trap circuit 2.

The amplifier 5 amplifies the received signal and an A/D conversion module 6 converts the amplified signal into a digital signal. A pulse-compression filter 7 outputs a pulse-compression signal by performing a pulse-compression process (described below) for the digital signal from the A/D conversion module 6. The pulse-compression signal is detected by a detection module 8, and compression signal to display an underwater image on a display.

Hereinbelow, the pulse-compression filter 7 will be explained. The pulse-compression filter 7 of this embodiment performs a predetermined filtering process instead of performing the matched filtering process explained as the conventional technology. In this case, an input/output characteristic of the pulse-compression filter 7 is set such that, when the filter is inputted with an input signal having a waveform substantially equal to a waveform of the transmission signal, it has a window function shape in which a phase spectrum of an output signal corresponding to the input signal is linear and an amplitude spectrum of a frequency range of the output signal does not have a frequency component outside a sweep frequency range of the transmission signal (i.e., amplitude value is 0).

Figure 2:
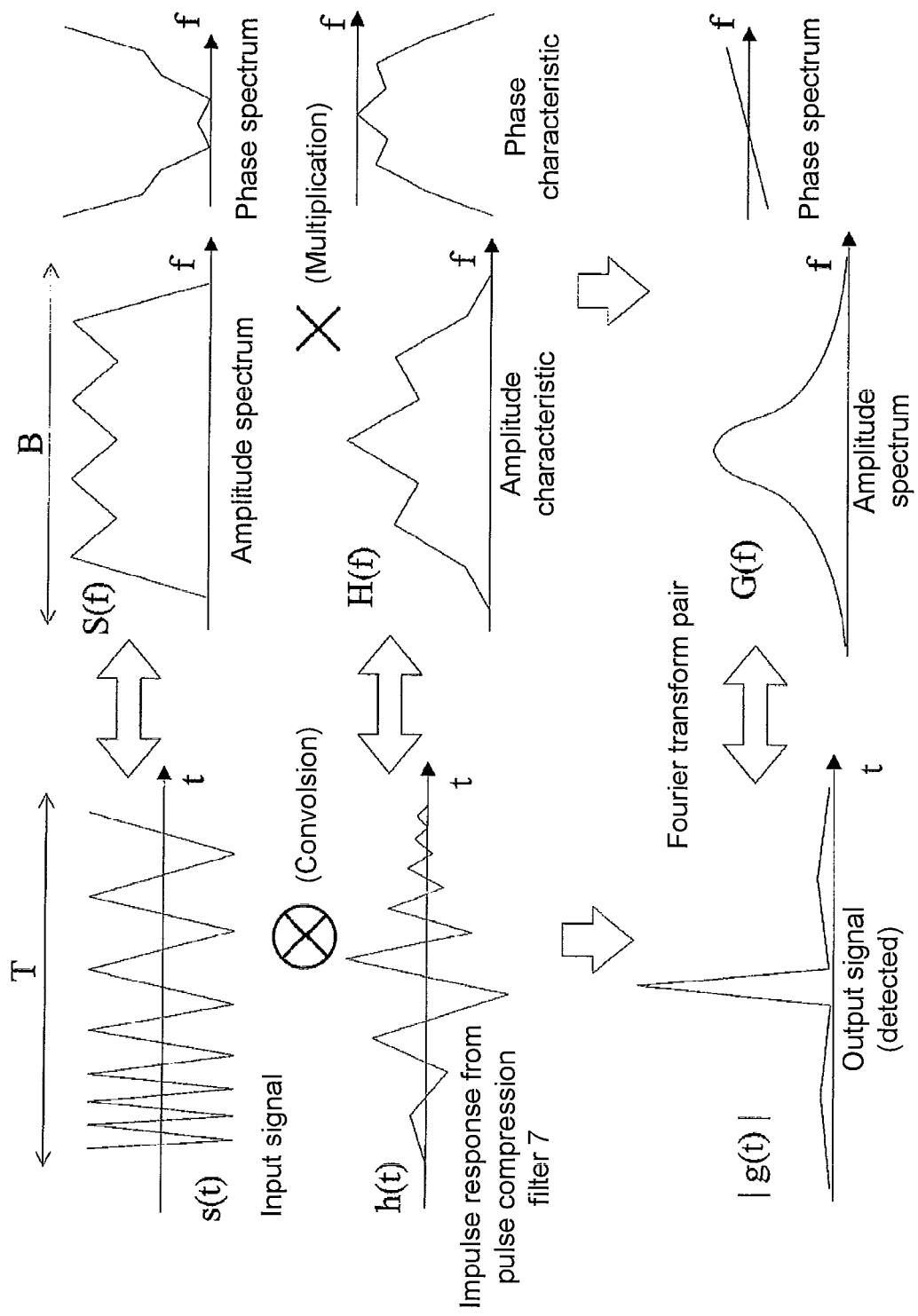
FIG. 2 is a schematic diagram for illustrating an input/output characteristic of a pulse-compression filter of FIG. 1.

FIG. 2 is a schematic diagram for illustrating the input/output characteristic of the pulse-compression filter 7 of this embodiment. Three graphs shown in the uppermost row of FIG. 2 are, from the left, an input signal s(t) to the pulse-compression filter 7, and an amplitude spectrum (|S(f)|) and a phase spectrum (arg[S(f)]) obtained by performing a Fourier transform S(f) for the input signal s(t). Three graphs shown in the middle of FIG. 2 are, from the left, an impulse response h(t) of the pulse-compression filter 7, and an amplitude characteristic (|H(f)|) and a phase characteristic (arg[H(f)]) of a system function H(f) obtained by performing a Fourier transform for the impulse response h(t). Three graphs shown in the lowermost row of FIG. 2 are, from the left, a detection waveform |g(t)| of an output signal g(t) which is a pulse-compressed signal, and an amplitude spectrum (|G(f)|) and a phase spectrum (arg[G(f)]) obtained by performing a Fourier transform G(f) for the output signal g(t).

The output signal g(t) can be expressed by a convolution integral of s(t) and h(t). This relation is shown in the following Equation (1).

$$g(t)=s(t)*h(t) \quad (1)$$

The system function H(f) can be expressed by the following Equation (2).

$$H(f)=G(f)/S(f) \quad (2)$$

The system function H(f) representing the input/output characteristic of the pulse-compression filter 7 can be obtained by defining the Fourier transform S(f) of the input signal and the Fourier transform G(f) of the output signal by using Equation (2).

For the input signal S(f), a signal having a waveform ideally the same as that of the transmission signal generated by the transmission signal generating module 3 is used. However, in an actual circuitry, by the time the transmission signal generated by the transmission signal generating module 3 is inputted into the pulse-compression filter 7, the transmission signal will pass through the analog modules, digital modules, and transducer of the transceiver system, each of which causes distortion to occur in the transmission signal. Therefore, it may be realistic to actually measure the linear distortion produced in the analog modules, digital modules, and transducer of the transceiver system, and use a signal including the actually-measured linear distortion as the input signal.

For the output signal G(f), it is selected to have a shape of a window function W(f) in which the phase spectrum is linear and the amplitude spectrum |G(f)| does not have a frequency component outside the sweep frequency range of the transmission signal (amplitude value is 0). Thereby, the output signal G(f) will not have a frequency component outside the sweep frequency band at the time of transmission, and as a result, an unnecessary noise component can be removed without another filter that performs a band restriction being provided.

The window function W(f) is adopted so that the waveform g(t) in a time range of the output signal corresponds to a signal having desired range side lobes. More specifically, in order to distinguish fish near a seabed from the seabed, it is necessary to suppress the range side lobes of the output signal g(t) to be less than −64 dB. As an example, a situation is assumed where a frequency modulation signal of a Bandwidth-Time (BT) product 50 (frequency sweep width 50 kHz, pulse width 1 ms) is used as the transmission signal. In this case, as the input signal s(t), a signal having the same waveform as that of the transmission signal is used.

For the window function W(f), Gaussian windows are used, and using the Gaussian windows having various dynamic ranges within the range of the frequency sweep width of 50 kHz, waveforms of the respective time ranges are obtained to search for range side lobes having a requested level.

Figure 3A:
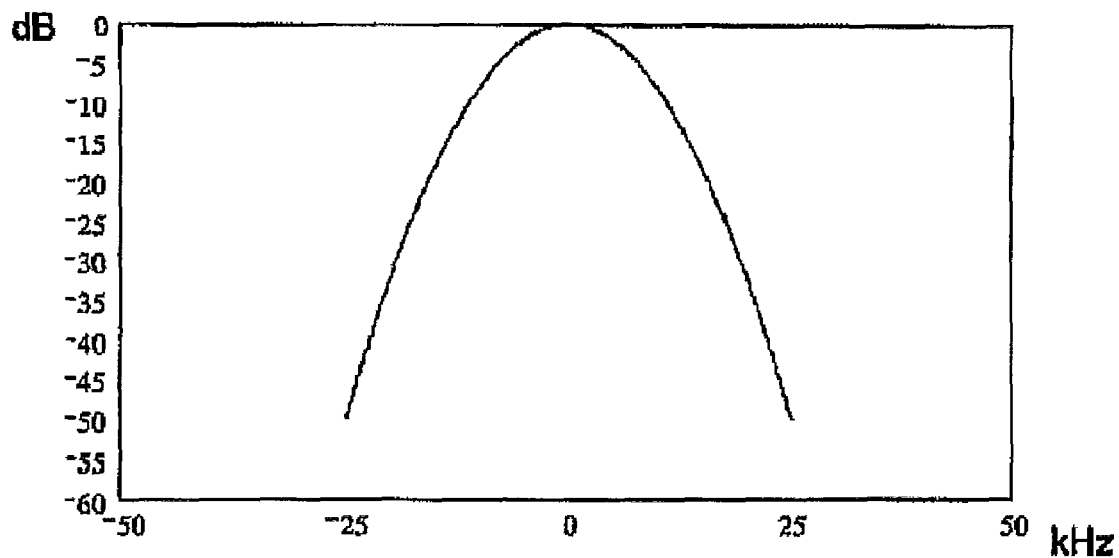
FIG. 3A is a graph showing a 50 dB Gaussian window as an example of a window function W(f) and FIG. 3B is a graph showing a waveform g(t) derived from the window function W(f).
Figure 3B:
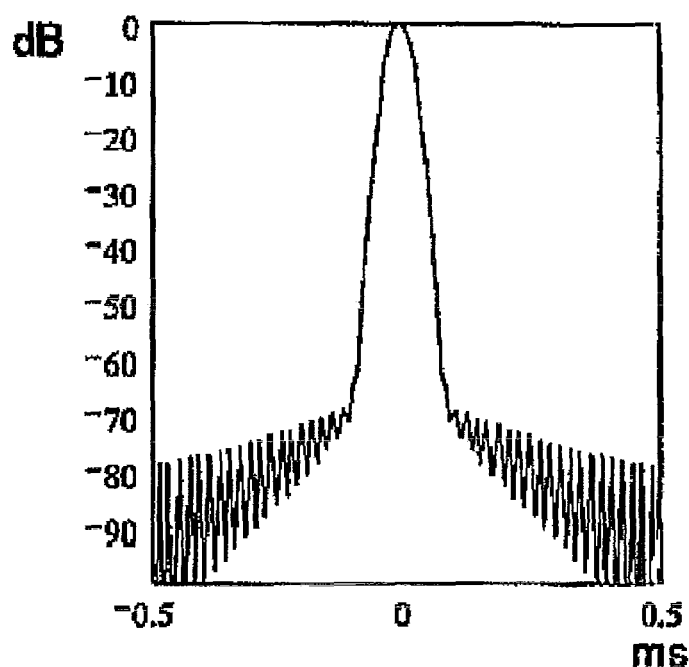

In the case of this example, assuming that a Gaussian window having a dynamic range of 50 dB within the range of the frequency sweep width of 50 kHz is used as the window function W(f) as shown in FIG. 3A, range side lobes of waveforms in the time range derived from the Gaussian window will be approximately −70 dB as shown in FIG. 3B. Therefore, a criterion for distinguishing the shoal of fish at the seabed (−64 dB or less) is satisfied.

Thus, when using the frequency modulation signal of the BT product 50 (frequency sweep width 50 kHz, pulse width 1 ms) as the transmission signal, the S(f) is set such that the waveform of the transmission signal in the time range is Fourier-transformed, and the G(f) is set such that the phase spectrum is linear and the amplitude spectrum |G(f)| has a shape of the window function W(f). Then, using the Equation (2) described above, a system function H(f) of the pulse-compression filter 7 is derived.

The level of the range side lobes of the output signal g(t) can be reduced by expanding the dynamic range of the window function W(f); however, on the other hand, because a main lobe width of the output signal g(t) spreads at the same time, an axial resolving power will be reduced and thereby deteriorating a S/N characteristic as well. Therefore, the dynamic range of the window function needs to be selected that takes into consideration both the range side lobe level and the main lobe width. Furthermore, depending on a use situation, an optimal window function W(f) needs to be selected with regards to the S/N ratio, axial resolving power, and range side lobe level.

In the above description, the characteristic of the window function W(f) is explained such that the value of the ranges other than the frequency sweep width of the transmission signal is 0. However, in an actual device, if the value is set to a sufficiently small value comparing with a value within the frequency sweep width, it still does not cause any problems, and such a value may also be considered to be the window function in this embodiment.

Further, as the window function W(f), other various window functions, such as a Hanning window, Humming window or Blackman window can be used rather than the Gaussian window described above.

Next, an envelope control of the transmission signal will be explained. For a fishfinder carried in a water vessel, a Doppler shift of the transceiver signal resulting from the up-and-down motion of the hull may occur. In order to increase the tolerance to the Doppler shift, it may be desirable to make the amplitude spectrum of the transmission signal to a characteristic as flat as possible. Therefore, in this embodiment, a predetermined envelope control is carried out to the transmission signal. Next, the envelope control of the transmission signal for increasing the Doppler tolerance will be explained.

As an envelope of the transmission signal, an envelope to which sine-shaped edges are added to both ends of the rectangular window may be suitable. For example, the envelope has a rectangular shape in its intermediate section corresponding to approximately 80% of the entire pulse length of the transmission signal, and has a sine waveform with a dynamic range of approximately 30 dB in starting and ending sections of the transmission signal to provide a Doppler tolerance to the up-and-down motion of the hull at approximately 1 m/s.

When the transmission signal has the envelope, the input signal s(t) used when defining the input/output characteristic of the pulse-compression filter 7 may have an envelope as well. In order to increase the Doppler tolerance, increasing in the BT product may also be effective.

As described above, in this embodiment, because the frequency component of the pulse-compression signal is locally positioned in ranges divided by the window function W(f), it is not necessary to provide a filter to improve the S/N ratio after a pulse-compression stage. This can be said to be configurationally advantageous. Further, because a desired level of the range side lobes can be realized with the filtering process by the pulse-compression filter 7, it is not necessary to multiply the transmission signal by a window function of acute-shape, such as a Gaussian window, and it does not significantly degrade detection performances, such as a S/N ratio, detection distance, etc.

Although the above embodiment is described for the case where the invention is applied to a fishfinder, the invention may also be applied to other transceiving devices of pulse signals, such as a radar. In the above embodiment, the application is directed to sea; however, any water application may be possible within the scope of the invention.

In the foregoing specification, specific embodiments of the present invention have been described. However, one of ordinary skill in the art appreciates that various modification and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims, including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "approximately" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be confided in ways that are not listed.

What is claimed is:

1. A transceiving device of a pulse signal, comprising:
   a transmission signal generating module for generating a transmission signal that is frequency-modulated by a predetermined frequency sweep width;
   a transceiver module for transmitting a pulse signal having substantially the same waveform as a waveform of the transmission signal and receiving an echo signal corresponding to the transmission signal from a detection range; and
   a pulse-compression filter for pulse-compressing the echo signal received by the transceiver module,
   said pulse-compression filter being a mismatched filter; and
   said pulse compression filter having an input/output characteristic such that, in response to receiving an input signal having substantially the same waveform as the waveform of the transmission signal, said pulse compression filter performs pulse compression with a window function having a shape such that a phase spectrum of an output signal corresponding to said received input signal is a linear function of frequency and an amplitude spectrum of the output signal only has a frequency component of a frequency band with which a frequency sweep is carried out; and
   wherein a dynamic range of the window function shape is determined based on a desired level of range side lobes and a width of a main lobe in a time range of the output signal.

2. The transceiving device of the pulse signal of claim 1, wherein the input signal includes distortion generated after the transmission signal generating module outputs the transmission signal and before the echo signal received by the transceiver module is inputted into the pulse-compression filter.

3. The transceiving device of the pulse signal of claim 1, wherein the transmission signal generating module generates the transmission signal having an envelope of a shape in which sine-shaped edges are added to both ends of a rectangular window.

4. A method of transmitting and receiving a pulse signal, the method comprising:
    generating a transmission signal that is frequency-modulated by a predetermined frequency sweep width;
    transmitting a pulse signal having substantially the same waveform as a waveform of the transmission signal;
    receiving an echo signal corresponding to the transmission signal from a detection range;
    pulse-compressing the received echo signal using a mismatched pulse-compression filter
    that has an input/output characteristic such that, in response to receiving an input signal having substantially the same waveform as the waveform of the transmission signal, said pulse compressing includes pulse-compressing with a window function having a shape such that a phase spectrum of an output signal corresponding to the input signal is a linear function of frequency and an amplitude spectrum of the output signal does not have a frequency component other than a frequency band with which a frequency sweep is carried out; and
    determining a dynamic range of the window function shape based on a desired level of range side lobes and a width of a main lobe in a time range of the output signal.

5. The method of claim 4, wherein the input signal includes distortion generated after the transmission signal is generated and before the echo signal is inputted into the pulse-compression filter.

6. The method of claim 4, wherein the transmission signal has an envelope of a shape in which sine-shaped edges are added to both ends of a rectangular window.

7. The device of claim 1, where said desired level of range side lobes is −64 dB or less.

8. The method of claim 4, where said desired level of range side lobes is −64 dB or less.

* * * * *